Feb. 5, 1963 F. E. SIMO 3,076,906
EDDY CURRENT CLUTCH CONTROL FOR A SYNCHRONIZED DRIVE
Filed April 6, 1959 4 Sheets-Sheet 2

INVENTOR.
FRANK E. SIMO
BY Teare, Kramer, Sturges & Fetzer
ATTORNEYS

INVENTOR.
FRANK E. SIMO
BY
Teare, Kramer, Sturges & Fetzer
ATTORNEYS

United States Patent Office 3,076,906
Patented Feb. 5, 1963

3,076,906
EDDY CURRENT CLUTCH CONTROL FOR A SYNCHRONIZED DRIVE
Frank E. Simo, Kenosha, Wis., assignor to Eaton Manufacturing Company, Cleveland, Ohio, a corporation of Ohio
Filed Apr. 6, 1959, Ser. No. 804,258
11 Claims. (Cl. 310—94)

This invention relates in general to multiple drive, variable speed systems, and more particularly to speed regulation of such multiple drive systems.

Many applications such as are found in the textile, paper and rubber industries require synchronization of two or more drives embodied in various types of processing equipment, such as for instance strip feeding or transfer mechanisms of tire building devices, rubber processing machinery, paper manufacturing machinery, and the like, and such synchronization may require that the output shafts of the drives are not only operating at the same revolutions per minute, but also that the relative positions or "phase" of the output shafts are synchronized, in order to maintain precise and synchronized control of the "draw" between sections of the mechanism, and thus prevent rupture of the material being handled. In addition, in some processes, the material being processed changes length as it is being conveyed, which raises the desirability or necessity of not only providing for precise speed and phase synchronization in the equipment, but also the ability to "offset" the speed of one drive mechanism with respect to an associated drive mechanism. This offsetting of the speed of one drive with respect to another drive must be able to be easily accomplished by the operator, and after the magnitude of the offset speed is selected, it must be able to be maintained with a relative high degree of accuracy, in order to provide for effective operation of the mechanism.

The instant invention provides a variable speed control arrangement for a multiple drive system including mechanism for synchronization of the drives, and for selectively controlling the "draw" between such drives.

Accordingly, an object of the invention is to provide a multiple drive, variable speed system having improved speed regulating characteristics.

Another object of the invention is to provide a multiple drive system of the latter mentioned type having adjustable "draw control" between the drive sections of the system.

Still another object of this invention is to provide a simplified, more economical, multiple drive system, and one which possesses precise "draw control" characteristics.

Briefly, the foregoing and other objects and advantages are accomplished in accordance with the invention by providing a variable speed, multiple drive system, as for example a pair of drive units, for a common load, such as a transfer or feed mechanism for a continuous web or sheet of material, wherein each drive embodies individual speed control means, such as an electronic control unit and associated potentiometer, and is electrically coupled to the output shaft at the load through an electrical slip clutch having an eddy current coupling. The output shaft of each drive is also coupled to signal producing means, such as a selsyn generator, for producing an electrical signal or voltage corresponding to the speed of the associated drive. The electrical signal from each drive may then be fed into a signal comparing means, such as a differential selsyn motor unit, the latter being coupled to operate the speed control means of one of the drives in accordance with the compared result of the electrical signals from the drives, whereby the latter are locked in synchronism. In order to provide for offsetting the speed of one of the drive units with respect to the other to thereby introduce selective "draw" control into the system, a third, variable speed auxiliary drive unit controlled by individual speed setting means, such as an electronic speed control unit and associated potentiometer, is operatively coupled into the system together with means for modifying the signal produced by one of the signal producing means of the main drives, to thereby introduce the required offset or differential in fixed r.p.m. between the main drive units.

In the drawings:

FIG. 1 is a combined diagrammatic and schematic illustration of a multiple drive system utilizing selsyn generators and a selsyn differential motor unit for maintaining the drives in speed and phase synchronization and which includes a supplementary variable speed drive unit and a controlling potentiometer for introducing a fixed r.p.m. displacement between the main drive units of the system, while still maintaining phase synchronization therebetween.

Figure 1:
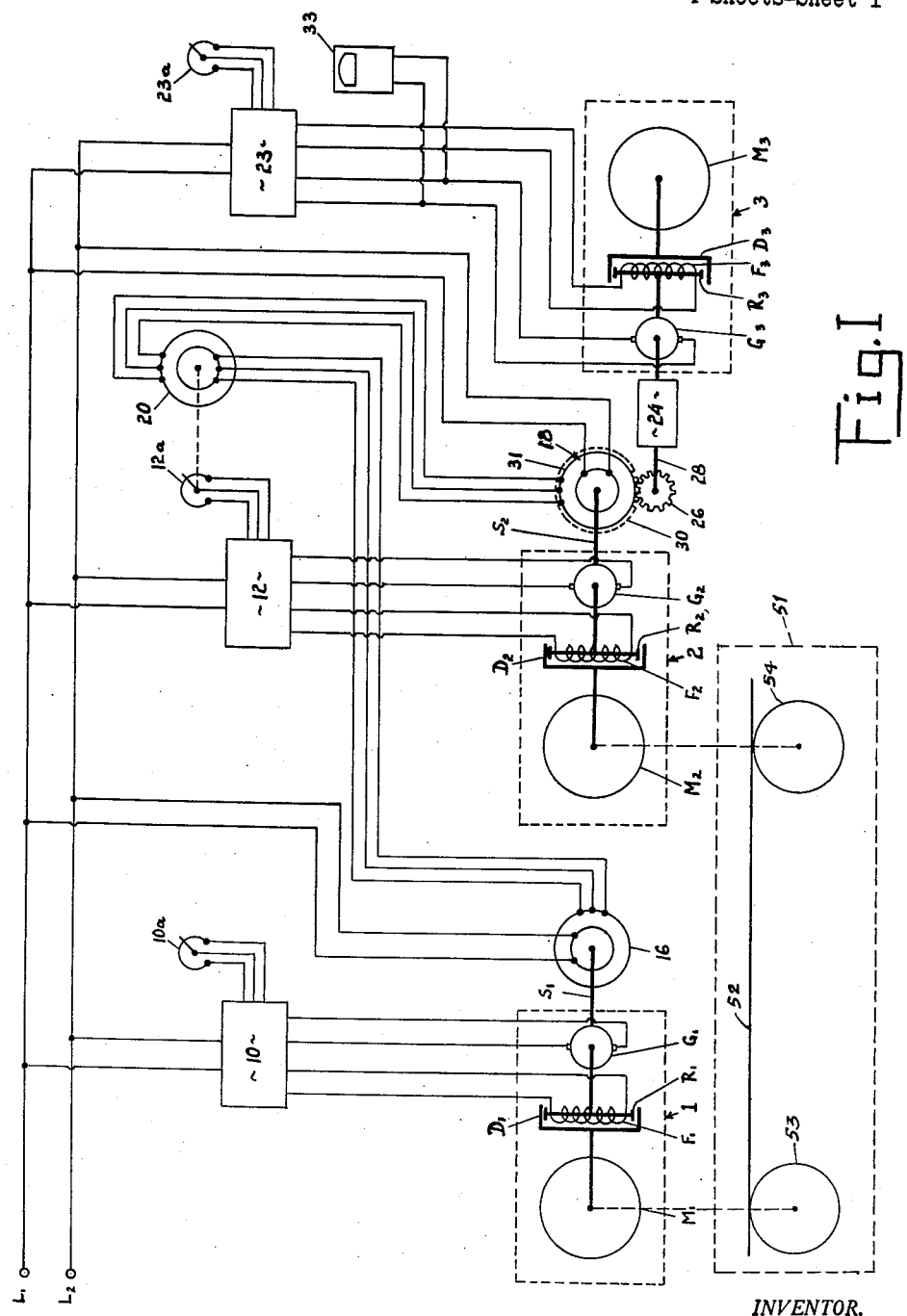

Referring now to FIG. 1 of the drawings, there is diagrammatically and schematically illustrated a variable speed, multiple drive system for a common load 51, the system comprising individual main drive units 1 and 2 for use. For instance the common load 51 may be a transfer or feed mechanism in a machine in which the material being processed, such as a continuous web of paper 52, has relatively little strength, and therefore the need for synchronization of the drive units is apparent. Since the web 52 may vary in dampness, stretching or contracting between conveyor drums 53 and 54, driven by motors $M_1$ and $M_2$, respectively, very accurate maintenance of speed offset between drive units is required. Each drive unit illustrated includes a conventional squirrel cage motor $M_1$ or $M_2$, each having a drum $D_1$ or $D_2$ on its output shaft adapted for eddy current coupling in a conventional manner with a rotor member $R_1$ or $R_2$. A speed or tachometer generator $G_1$ or $G_2$ is mounted on each of the output shafts $S_1$ or $S_2$ of the variable speed drives for use with an associated electronic speed control unit to be hereinafter described. Each output shaft is adapted to be drivingly coupled to a preselected point in the transfer or feed mechanism of the associated apparatus. The latter may be accomplished in any suitable manner as for instance by conventional gears and the like, and is not illustrated here. For purposes of the description, the drums $D_1$ and $D_2$ and their associated motor drives $M_1$ and $M_2$ are considered as the driving members of the drive units, while the field members $R_1$ or $R_2$, together with their associated speed generators $G_1$ or $G_2$, and couplings to the load, are considered as the driven members of the drive units. The rotor member $R_1$ or $R_2$ of each driven member has an exciting field coil $F_1$ or $F_2$ which is adapted to be excited to provide the necessary magnetic field which coacts in a well known manner with an induced eddy current field in the corresponding drums $D_1$ or $D_2$, to transmit driving torque from the driving member to the driven member. Since the voltage generated by each speed generator $G_1$ or $G_2$ is proportionate to the speed of the corresponding driven member, it is readily apparent that its output can be utilized to control the speed of the driven member. An electronic speed control unit 10 or 12 and associated speed setting potentiometer 10a or 12a respectively, is associated with each of the driven members for setting the predetermined speed at which the drive units will operate. Such electronic speed control units are of known construction, employing a reference voltage source and a feedback signal from the associated speed generator $G_1$ or $G_2$. The electronic control, by utilizing a speed or tachometer generator signal, supplies the proper current to the field coil $F_1$ or $F_2$ to hold the load at a present speed. With a reduction in load, the drive will begin to pick up speed while the increasing tachometer generator signal rapidly decreases current to the field coil, returning the load to the preset speed. On the other hand, should the load increase, drive speed would decrease and the tachometer generator signal would rapidly increase the current to the field or coupling coil, returning the load to the preset speed. For any one position of the speed setting potentiometer 10a or 12a, slight speed changes occur when the load varies until the speed automatically stabilizes at the preset point.

Figure 4:
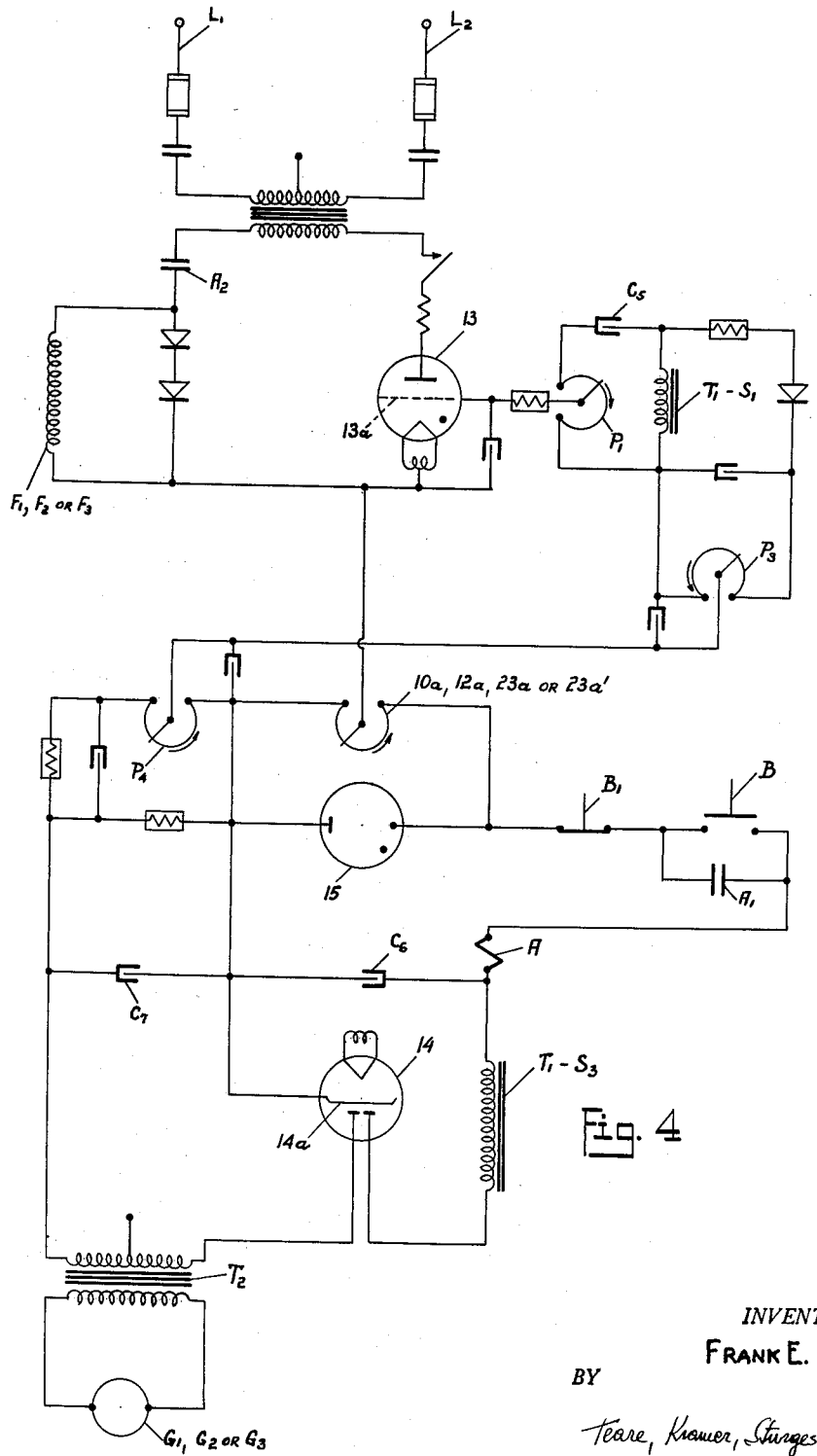
FIG. 4 is a schematic illustration of one embodiment of a circuit for the aforementioned electronic control units and associated potentiometers, for controlling the speed of the respective drive unit.

Referring now to FIG. 4 for a more detailed description of one preferred embodiment of such a speed control unit, it will be seen that the controlling member is a gas-filled thyratron 13 which regulates the current in the power circuit in accordance with the potential supplied to its grid 13a in a well known manner. The potential at the grid 13a is in turn controlled by the associated speed governing portion of the circuit which applies a so-called rider wave potential, a governed potential, and a reference potential to the grid at any given instant. Speed selection and speed maintenance are functions of these potentials at the thyratron grid.

The rider wave potential is provided by a transformer secondary winding $T_1$—$S_1$, and a condenser $C_5$ shifts this potential wave out of phase with the anode voltage. The potentiometer $P_1$ adjusts the control relation or sensitivity of response to load changes.

The governed potential is produced by the respective tachometer generator, as for instance $G_1$, and varies directly, as aforesaid, with the speed of the associated driven member. This voltage is stepped up by the transformer $T_2$ and rectified by a conventional rectifier 14. A condenser $C_7$ filters the half-wave rectified output to provide a relatively smooth direct current beyond that point. The resultant governed potential may be adjusted by a potentiometer $P_4$ which determines the maximum speed of the drive. The potential from this portion of the circuit to the grid 13a is always a negative value.

The reference potential provides a positive voltage in the thyratron grid circuit which can be adjusted, for instance, by the potentiometer 10a, to set the speed at which the drive is to operate. This portion of the circuit is independent from the governed portion of the circuit and is energized by the transformer secondary winding $T_1$—$S_3$. The cathode 14a of the rectifier 14 is common to both portions of the circuit and rectifier 14 serves the dual function of rectifying the alternating current in both portions of the circuit. The condenser $C_6$ operates to release energy to the circuit in the off cycle to provide a smooth continuous flow of direct current beyond that point. A gas filled voltage regulator 15 is also provided to isolate the circuit from line voltage fluctuations and operates to maintain a relatively constant voltage across the speed setting potentiometer 10a. The remainder of this portion of the control circuit provides a manual control such that by depressing the run button B, the relay coil A is energized and closes its contacts $A_1$ and $A_2$. Closing of the $A_1$ contact provides a holding circuit which maintains the $A_2$ contact in the anode circuit closed until the stop button $B_1$ is depressed.

Thus, by adjusting the speed setting potentiometer, as for instance 10a, it is possible to set the predetermined speed at which the drive unit to which the control circuit is applied will operate. The sensitivity to load changes is controlled by $P_1$ and the maximum and minimum speed adjustments are controlled by $P_4$ and $P_3$. When the various potentiometers are set for a predetermined speed and sensitivity, variations in the tachometer generator output due to variations in the speed of the driven member of the drive unit will be reflected in the control circuit to control the firing of the thyratron, and thereby to control the direct current supplied to the field coil, as for instance $F_1$, of the respective electrical slip clutch.

By presetting a speed with potentiometer 10a of drive unit 1, the output shaft of such drive unit will arrive at the preset speed within the accuracy of the respective electro-responsive means represented by the electronic controller 10, coupled to A.C. power supply lines $L_1$, $L_2$.

It can be assumed here for purposes of discussion that the controller may have a regulation accuracy of 2% and a drift accuracy of .5%. Therefore for a change in the load from 25% to 100%, the output shaft of the drive unit can change 2% of top speed. Also assuming the drive unit has a speed range of 20 to 1, the drive can be set for any speed over this 20 to 1 range. Once the speed potentiometer 10a has been set, the speed will drift no more than .5% of top speed, assuming also that the load has not changed. With control accuracies as discussed above for drive No. 1, it is apparent that to synchronize two drives with these accuracies, considerable speed deviations will occur between the drives 1 and 2 while undergoing changes in load.

In order to synchronize drives 1 and 2, a selsyn or servo-generator 16 or 18 is coupled to the output shaft of each of drives 1 and 2, and the output voltage of each selsyn generator is fed into or reflected in a selsyn differential motor unit 20 which is adapted to operate the speed setting potentiometer 12a of drive No. 2. The torque required from the differential motor unit 20 is small since it is only necessary to drive the relatively small potentiometer 12a which requires a low torque. As long as the output of selsyn generators 16 and 18 adds up to zero, no adjustment of the speed setting potentiometer 12a will be obtained. However, if drive unit 2 is lower or higher in speed than that of drive unit 1, the differential motor 20 will actuate the speed setting potentiometer 12a of drive unit 2 in a direction so as to cause drive unit 2 to be placed in synchronization with drive unit 1. Up to this point there has been merely a synchronization of the two variable speed drives, with no selectively adjustable draw control factor being ejected into the system.

As aforediscussed, some processes require that the speed of one drive unit be "offset" from that of a second drive by a fixed number of r.p.m. It is necessary that the "offset" or draw adjustment be readily available to an operator, and it is also necessary to keep the drives in phase synchronization once this r.p.m. offset is selected. In order to accomplish this "offset," which is the principal feature of the instant invention, another variable speed, drive unit No. 3 is added to the system. Drive unit 3 includes a drive motor $M_3$, a drum $D_3$, a rotor member $R_3$, a coupling coil $F_3$, a speed generator $G_3$, coupled to an electronic controller 23, having a speed setting potentiometer 23a, in a generally similar arrangement as that comprising the main drive units 1 and 2. The motor unit $M_3$ of this third variable speed drive is a fractional horse power unit with sufficient power to drive through a gear reducer unit 24 and then to another gear 26, secured to common shaft 28 of the drive unit, which is in turn meshed with a ring gear 30, secured to the exterior housing or field 31 of aforementioned selsyn generator 18. Selsyn generator 18 is journaled in trunnion bearings so that the entire housing and associated flux field can be caused to rotate. Accordingly, upon rotation of the field 31 of the selsyn generator 20, the electrical output of the generator is modified by a desired value as dictated by the setting of the potentiometer 23a controlling the speed at which drive 3 is caused to operate. A percent adjust meter 33 of conventional type, which receives a voltage from the speed generator G3 of drive unit 3, may be provided for easily determining the degree of "offset" or "draw" introduced into the system.

The following is a theoretical analysis of the possible degree of "draw" adjustment obtainable with the aforedescribed arrangement:

Assuming that—

$N_2$=Set point speed in r.p.m. of drive unit No. 2
$\Delta N_2$=Desired "draw" or change in set point r.p.m. of drive No. 2
$N_3$=Set point speed in r.p.m. of auxiliary drive No. 3
$K$=gear ratio of the gearing mechanism then:

$$\Delta N_2 \times K = N_3$$

and assuming for illustrative purposes that:

$N_3$=1700 r.p.m.
$K$=340 to 1 reduction
$N_2$=1700 r.p.m.

Then:

$$\Delta N_2 = 1700 \text{ r.p.m.} \div 340 = 5 \text{ r.p.m.}$$

and $$\Delta N_2 + N_2 = 5 \text{ r.p.m.} + 1700 \text{ r.p.m.} = 1705 \text{ r.p.m.}$$

Now if variable speed drive unit 3 is adjustable over a speed range of 20 to 1, $\Delta N_2$ can be made to vary from 0.25 r.p.m. to 5 r.p.m. in increments of the order of 5/30,000 r.p.m. assuming that a ten turn Helipot having 30,000 turns of wire is used as the draw adjust potentiometer 23a. $N_2$ can therefore be modified by these same increments. It is to be noted that the regulation of the "draw" adjust, variable speed drive 3 need not be of high degree since the connected load is generally relatively constant. The problem therefore substantially resolves itself in providing a variable speed drive having a low drift characteristic. A standard auxiliary drive with a drift of the order of 0.5% regulation can readily be provided.

Employing a variable speed drive 3 for the draw control, having a drift accuracy of 0.5% of top speed, $\Delta N_2$ can be adjusted from 0.25 r.p.m. to 5 r.p.m. with the speed being held to 0.5% of 5 r.p.m. over the speed range for any selected speed point desired within this range.

The regulation of the draw control drive 3 due to drift may therefore be figured as:

$$\text{Percent regulation} = \frac{\Delta N_3 \times 100}{N_3}$$

where $\Delta N_3$ is the change in speed due to drift of drive 3

$$\Delta N_3 = \frac{N_3 \times \text{percent regulation}}{100} = \frac{1700 \times 0.5 = 8.5 \text{ r.p.m.}}{100}$$

Since $$\Delta N_2 = \frac{N_3}{K} = \frac{8.5}{340} = .25 \text{ r.p.m.}$$

It is seen therefore that the change in r.p.m. at the output of the shaft $S_2$ of drive 2 due to the drift of the draw control unit 3 will only be .025 r.p.m. Therefore the percent regulation at the output shaft of drive 2 due to the drift of the draw control is given as:

$$\text{Percent regulation} = \frac{\Delta N_2 \times 100}{1700}$$

$$= \frac{.025 \times 100}{1700}$$

$$= .00147\%$$

The above calculations serve to illustrate that the drift of "draw" control drive 3 contributes little to the deviation of the pre-selected "draw." However, it will be further understood that this "drift" effect of drive 3 will be considerably reduced if the reference voltage supply of drive 3 is the same as that used for drives 1 and 2, in which event any variation due to drift of the single reference voltage supply would cause all of the drives to vary in speed by the same percentage. There would of course be some resultant error due to the non-linearity of the tachometer generators $G_2$ and $G_3$, but such error would be very small.

Figure 2:
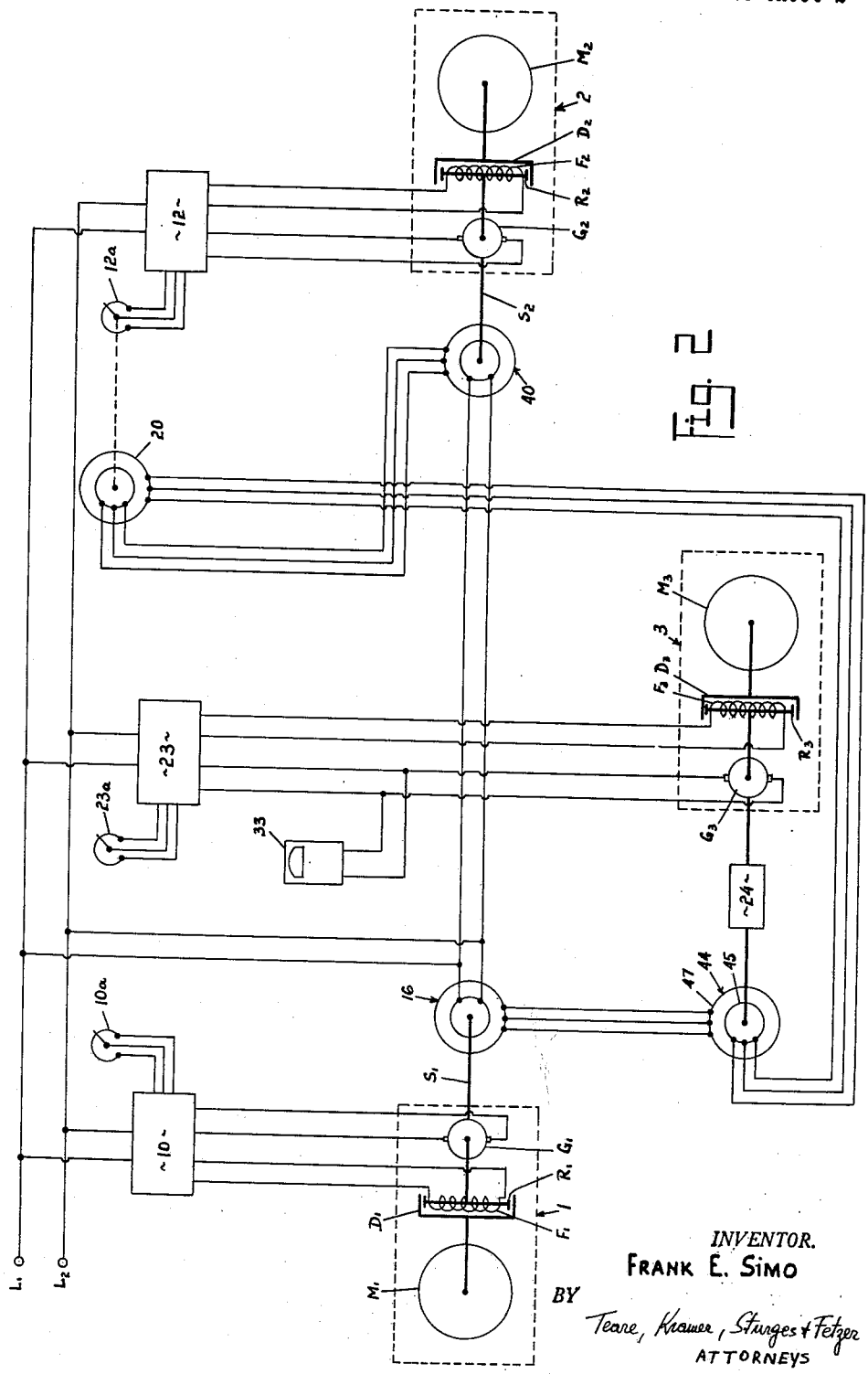
FIG. 2 is a combined diagrammatic and schematic illustration of a modification of the system illustrated in FIG. 1.

FIG. 2 shows an arrangement utilizing a differential selsyn generator and an auxiliary variable speed drive, in a control system somewhat similar to that illustrated in FIG. 1. Like references numbers and letters have been utilized in FIG. 2 to designate those elements which are generally identical to those found in the system of FIG. 1. However, it will be seen that the outer housing or field of selsyn generator unit 40, attached to the output shaft $S_2$ of drive No. 2, is not rotatable and is not connected directly to the auxiliary variable speed drive No. 3 as in the first embodiment. A differential selsyn generator 44 is introduced between the selsyn generator 16 on main drive No. 1 and the differential selsyn motor unit 20, which actuates the speed setting potentiometer 12a of drive 2. The rotor 45 of the differential selsyn generator 44 is driven by the variable speed, auxiliary drive 3 through a gear reducer 24 in a similar manner as aforedescribed in connection with the system of FIG. 1. It will be seen therefore, that the electrical information fed from the rotor 45 of the differential selsyn generator 44 to differential motor unit 20 which controls speed setting potentiometer 12a of drive unit 2, is modified as compared to that fed to the field 47 of selsyn generator 44 from the selsyn generator 16 on the output shaft of drive No. 1. This modification is due to the mechanical rotation of the rotor or primary of the differential selsyn generator 44 by the variable speed, auxiliary drive 3. The variable speed drive No. 3 therefore introduces the "draw" information into the system, or in other words, introduces the "offset" desired between drive unit 1 and drive unit 2. Accordingly, the drives 1 and 2 may operate in phase synchronization but with a fixed r.p.m. displacement therebetween. The degree of draw introduced to the system is easily read on a percentage adjust meter 33 which receives the voltage from the governor generator $G_3$ of the variable speed drive 3, in a manner similar to that discussed in connection with the system of FIG. 1.

Figure 3:
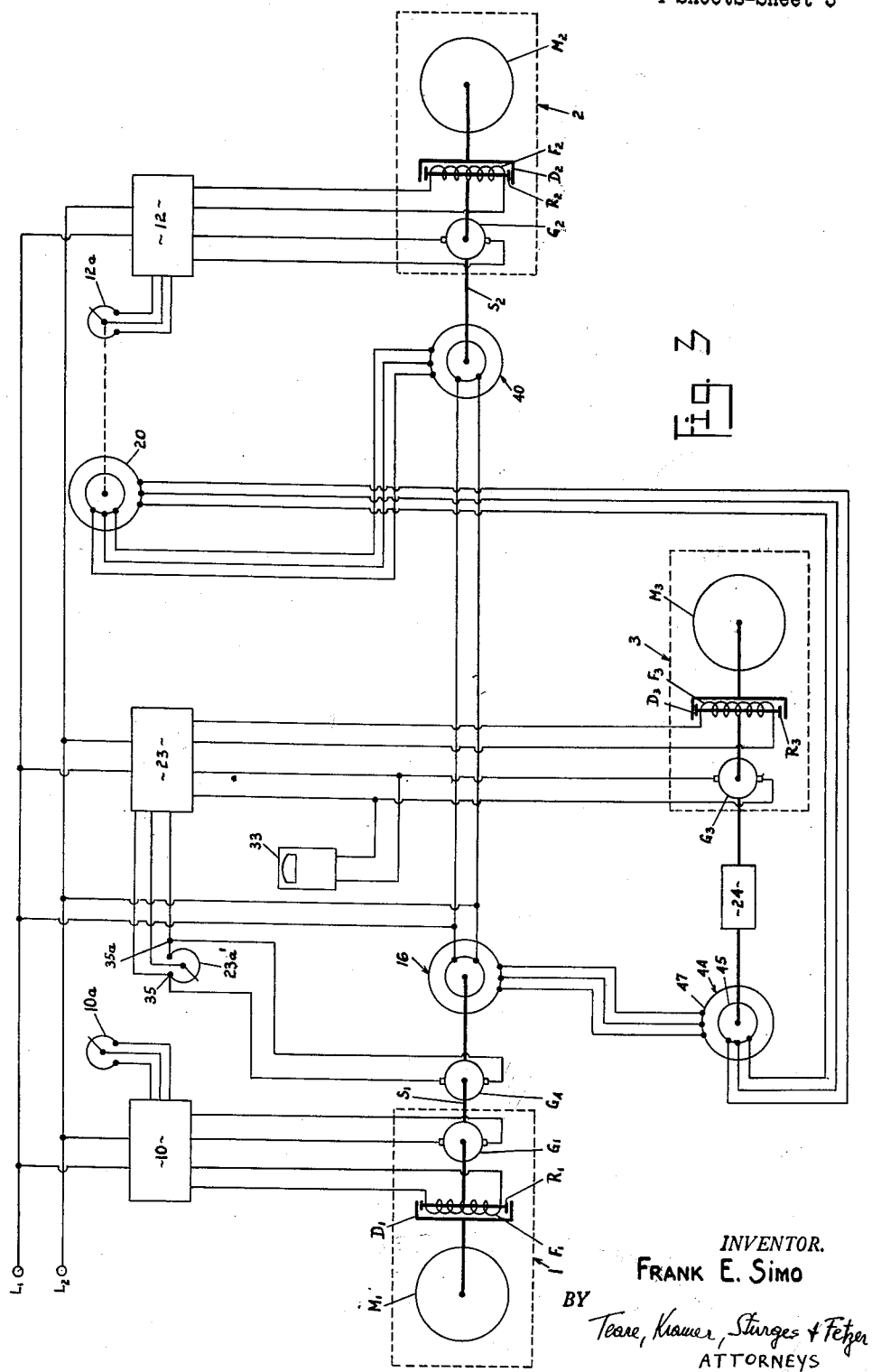
FIG. 3 is a combined diagrammatic and schematic illustration of a further modification of the systems illustrated in FIGS. 1 and 2.

FIG. 3 illustrates another modification of the control systems of FIGS. 1 and 2. Like reference numbers and letters have been utilized in FIG. 3 to designate those elements which are generally identical to those of the previously described systems. The FIG. 3 arrangement provides for phase synchronization of two or more drives with the introduction of a "draw" adjustment which is a function of the speed of the master drive unit 1. The physical arrangement to accomplish the latter comprises a direct current tachometer generator $G_4$ driven by the output shaft $S_1$ of the drive unit 1. The output voltage of generator $G_4$ is applied across the "draw adjust" potentiometer 23a', as at 35, 35a, to thus impose a D.C. reference voltage on the electro-responsive means or speed control unit 23 of the "draw" control drive unit 3. Accordingly, as the speed of drive unit 1 is caused to vary to adjustments of its potentiometer control 10a, the "draw" speed of unit 3 will vary by the same percentage, since the generator $G_4$ on the output shaft of drive unit 1 will cause the imposed D.C. reference voltage to the speed control of unit 3, to vary and by the same percentage as that due to the adjustment of the potentiometer control 10a of drive unit 1. The magnitude of the "draw" speed introduced into the system by drive unit 3 is of course adjustable by the "draw adjust" potentiometer 23a', the same as before.

From the above discussion and accompanying drawings it will be seen that the invention provides an improved, multiple drive, variable speed control system which is particularly well adapted for use with apparatuses processing comparatively low strength, readily expandable or stretchable materials, and which not only synchronizes the various drive sections of the apparatus, but which includes means wherein the operator may readily incorporate "draw" adjustment or "offset" between the drive sections of the apparatus, to thereby operate the apparatus in phase synchronization with a fixed r.p.m. displacement therebetween.

The terms and expressions which have been employed are used as terms of description and not of limitation and there is no intention in the use of such terms and expressions of excluding any equivalents of any of the features described or shown, or portions thereof, but it is recognized that various modifications are possible within the scope of the invention claimed.

I claim:

1. In a multiple drive system, the combination comprising a pair of variable speed drives adapted to be independently coupled in driving relation to a common load, each of said drives comprising driving and driven members electrically coupled to one another by an electrical signal-responsive slip clutch of electrically controllable speed ratio between driving and driven members for independently transmitting the driving torque from the driving member to the associated driven member, independent speed control means for each of said drives, each of said speed control means including means coacting in response to variations in speed of the corresponding drive to automatically compensate for such speed variations in each drive respectively, independent means coupled to each of said drives respectively for translating the speed of each driven member into a corresponding electrical signal, means coupled to the speed-ratio control means of one of said clutches for comparing said signal output of each of said drives and changing the compared result into a corresponding adjustment of said last mentioned speed-ratio control means whereby the speeds of said driven members are synchronized, and means coupled to the speed translating means of one of said drives for modifying said signal output thereof to provide a selected offset in the speeds of said driven members with respect to one another.

2. In a multiple drive system including a pair of variable speed drives adapted to be independently coupled in driving relation to a common load, each of said drives comprising a driving member and a driven member electrically coupled to one another by an electrical slip clutch, each of said clutches having an energizing field coil, adjustable speed control means for each of said drives for selectively supplying a predetermined excitation to each of said field coils, an electrical signal emitting means coupled to each of said driven members and operative in response to variations in the speeds of said driven members to modify any selected predetermined excitation in a manner to compensate for said variations in speed, independent means coupled respectively to each of said driven members for translating the speed thereof into a corresponding electrical signal, signal comparing means coacting to compare the signal output of said translating means and including means drivingly coupled to the speed control means of one of said drives for changing the compared result into a corresponding adjustment of the speed control means of said one drive whereby the speed of said one driven member is synchronized with the speed of the other driven member, and means coupled to the speed translating means of one of said drives for modifying said signal output thereof to provide a selected offset in the speeds of said driven members with respect to one another.

3. In the multiple drive system of claim 2 wherein said modifying means comprises an auxiliary drive unit including a speed setting potentiometer, said auxiliary drive unit being operatively coupled to the speed translating means of one of said drives for modifying the electrical signal of said last mentioned means as dictated by the setting of said potentiometer controlling the speed of said auxiliary drive unit.

4. In the multiple drive system of claim 3 wherein the speed translating means of said one of said drives comprises a selsyn generator with the field portion of said selsyn generator being rotatably mounted with respect to the rotor portion thereof, said rotor portion being coupled to the output shaft of the associated drive, and wherein said field portion is coupled for rotation to said auxiliary drive unit.

5. In the multiple drive system of claim 2, wherein said modifying means comprises an auxiliary drive unit including a speed setting potentiometer, operatively coupled to the rotor portion of a differential selsyn generator, the field portion of said generator being electrically coupled intermediate said translating means of one of said drives and said signal comparing means for modifying the electrical signal of said translating means of said one drive as dictated by the setting of the potentiometer controlling the speed of said auxiliary drive unit.

6. In a multiple drive system the combination comprising a pair of variable speed drives each of which includes driving and driven members and an electrical signal-responsive slip clutch of electrically controllable speed ratio between driving and driven members for transmitting the driving torque from the driving member to the corresponding driven member, the driven member of each of said drives being adapted to be coupled in driving relation to a common load, independent speed control means including a speed-ratio setting potentiometer for each of said clutches, means for compensating for variations in the speed of each of said driven members, a selsyn generator mechanically coupled to each of said driven members for rotation of the rotor portion thereof, a differential motor unit electrically coupled to said selsyn generators, said differential motor unit being drivingly coupled to the speed setting potentiometer of one of said clutches for actuation of the latter upon a differential in speed between said drives to return said drives to synchronized operation, the field portion of one of said selsyn generators being rotatably mounted with respect to the rotor portion thereof, an auxiliary drive unit of generally similar construction as said first mentioned drives and including a speed setting potentiometer, said auxiliary drive unit being geared to said field portion for rotation of the latter as dictated by the setting of the potentiometer of said auxiliary drive unit whereby a selected offset in the speeds of said first mentioned drives with respect to one another may be obtained.

7. In a multiple drive system the combination comprising a pair of variable speed drives each of which includes driving and driven members and an electrical slip clutch for transmitting the driving torque from the driving member to the corresponding driven member, each of said drives being adapted to be coupled in driving relation to a common load, independent speed control means including a speed setting potentiometer for each of said drives, means for independently compensating for variations in the speed of each of said driven members, a selsyn generator mechanically coupled to each of said driven members for rotation of the rotor portion thereof, a differential motor unit electrically coupled to said selsyn generators for receiving the electrical output of the latter, said differential motor unit being drivingly coupled to the speed setting potentiometer of one of said drives for automatic actuation of the latter upon occurrence of a differential in speed between said drives to maintain said drives in synchronized operation, an auxiliary drive unit of generally similar construction as said first mentioned drives and including a speed setting potentiometer, a differential selsyn generator geared in driven relation to said auxiliary drive unit and operable at a speed dictated by the setting of the potentiometer of said auxiliary drive unit, said differential selsyn generator being electrically coupled intermediate one of said selsyn generators and said differential motor unit whereby the electrical output of said last mentioned selsyn generator to said differential motor unit is modified by the rotation of the rotor portion of said differential selsyn generator by said auxiliary drive unit, whereby a selected offset in the speeds of said first mentioned drives with respect to one another may be obtained.

8. In a multiple drive system the combination comprising, a pair of variable speed drives adapted to be independently coupled in driving relation to a common load, each of said drives having independent speed control means including an electro-responsive speed control unit and adjustable means for selectively applying a variable direct current reference voltage to said control unit, means operatively coupled to each of said drives to supply an electrical signal proportionate to its respective speed, means for automatically adjusting one of said adjustable means in proportion to the magnitude of the difference between said signals and in a direction to synchronize said drives, means for selectively modifying the output of one of said electrical signal supplying means to provide a selected offset in the speed of one of said drives with respect to the other, said last mentioned means including an auxiliary drive having an electro-responsive speed control unit and adjustable means for selectively applying a variable reference voltage to said last mentioned control unit, direct current generator means coupled to the other of said drives to supply an electrical voltage proportionate to the speed of said other drive, and means for applying said electrical voltage to said last mentioned adjustable means whereby the speed of said auxiliary drive will vary in accordance with the speed of said other drive.

9. In a multiple drive system, including a pair of variable speed drives adapted to be independently coupled in driving relation to a common load, each of said drives comprising a driving member and a driven member electrically coupled to one another by an electrical slip clutch, each of said clutches having an energizing field coil, adjustable electro-responsive speed control means employing a reference voltage source for each of said drives for selectively supplying a predetermined excitation to each of said field coils, an electrical signal generator coupled to each of said driven members and operative in response to variations in the speed of the respective of said driven members to modify any selected predetermined excitation in a manner to compensate for said variations in speed, servo-generator means coupled to each of said driven members for providing an electrical signal which reflects the speed thereof, means coupled to the speed control means of one of said drives for comparing the signal output of said servo generator means and changing the compared result into a corresponding adjustment of the speed control means of said one drive whereby the speeds of said driven members are synchronized, means coupled to the servo-generator means of one of said drives for modifying the signal output thereof to provide a selected offset in the speeds of said driven members with the respect to one another, said last mentioned means comprising an auxiliary drive unit having an adjustable electro-responsive speed control unit to selectively modify the electrical signal of said last mentioned servo-generator means, and further servo-generator means coupled to said driven member of the other of said drives for supplying a direct current reference voltage across said last-mentioned unit which is a function of the speed of the driven member of said other drive, whereby the speed of said auxiliary drive unit will automatically vary in accordance with the speed of the driven member of said other drive.

10. In a multiple drive system the combination comprising, a pair of variable speed drives adapted to be independently coupled in driving relation to a common load, each of said drives including an electro-responsive speed translator having independent speed control means, each speed control means having means coacting in response to variations in the speed of the corresponding drive to automatically compensate for such speed variations in each drive respectively, independent means for translating the speed of each driven member respectively into a corresponding electrical signal, means for comparing said signals and coacting with the speed control of one of said drives in response to a differential between the compared signals to synchronize the speed of said one drive with the speed of the other drive, and means coupled to and coacting with said synchronizing means to introduce a signal to provide a selected offset in the speed of said one drive with respect to the speed of the other drive.

11. In a multiple drive system the combination comprising, a pair of variable speed drives independently coupled in driving relation to a common load, each of said drives having independent speed control means each including a speed setting potentiometer, each of said speed control means including means coacting in response to variations in the speed of the corresponding drive to automatically compensate for such speed variations in each drive respectively, a pair of selsyn transmitters drivingly coupled respectively to each of said drives, a differential receiver unit coacting between the selsyn transmitters to compare their signals, said differential receiver drivingly coupled to the speed setting potentiometer of one of said drives and coacting therewith in response to a differential in transmitter signals to lock said one drive in speed synchronization with the other drive, and signal means coacting therewith to provide a selected differential between the speeds of said drives.

References Cited in the file of this patent

UNITED STATES PATENTS

| | | |
|---|---|---|
| 1,614,142 | Merrill | Jan. 11, 1927 |
| 1,655,663 | Rogers et al. | Jan. 10, 1928 |
| 2,451,946 | Harris | Oct. 19, 1948 |
| 2,885,616 | Anger et al. | May 5, 1959 |

FOREIGN PATENTS

| | | |
|---|---|---|
| 380,085 | Great Britain | Aug. 30, 1932 |
| 707,138 | Great Britain | Apr. 14, 1954 |
| 722,359 | Great Britain | Jan. 26, 1955 |
| 853,962 | France | Dec. 23, 1939 |
| 714,138 | Germany | Nov. 21, 1941 |
| 517,562 | Canada | Oct. 18, 1955 |